United States Patent
Horihata (10) Patent No.: US 8,618,776 B2
(45) Date of Patent: Dec. 31, 2013

(54) POWER GENERATOR WITH IMPROVED CONTROLLABILITY OF PHASE OF PHASE CURRENT

(75) Inventor: Harumi Horihata, Nagoya (JP)

(73) Assignee: Denso Corporation, Kariya (JP)

( * ) Notice: Subject to any disclaimer, the term of this patent is extended or adjusted under 35 U.S.C. 154(b) by 425 days.

(21) Appl. No.: 12/976,026

(22) Filed: Dec. 22, 2010

(65) Prior Publication Data

US 2011/0156664 A1    Jun. 30, 2011

(30) Foreign Application Priority Data

Dec. 24, 2009  (JP) .................................. 2009-292954

(51) Int. Cl.
*H02P 9/04*  (2006.01)

(52) U.S. Cl.
USPC ............................................. 322/24; 322/25

(58) Field of Classification Search
USPC .............................. 322/22, 23, 24, 25, 89, 99
See application file for complete search history.

(56) References Cited

U.S. PATENT DOCUMENTS

| | | | | |
|---|---|---|---|---|
| 4,456,870 A | * | 6/1984 | Rodari | 322/29 |
| 4,459,536 A | * | 7/1984 | Wirtz | 322/10 |
| 4,788,486 A | * | 11/1988 | Mashino et al. | 320/123 |
| 5,245,267 A | * | 9/1993 | Pierret et al. | 320/119 |
| 5,444,355 A | * | 8/1995 | Kaneyuki et al. | 322/58 |
| 5,455,500 A | * | 10/1995 | Shichijyo et al. | 322/90 |
| 5,719,484 A | | 2/1998 | Taniguchi et al. | |
| 5,764,036 A | * | 6/1998 | Vaidya et al. | 322/90 |
| 6,281,664 B1 | * | 8/2001 | Nakamura et al. | 322/22 |
| 6,366,060 B1 | * | 4/2002 | Ely et al. | 322/25 |
| 6,504,346 B2 | * | 1/2003 | Nakamura et al. | 322/90 |
| 7,256,567 B2 | * | 8/2007 | Kawamura | 322/46 |
| 7,990,115 B2 | * | 8/2011 | Anghel et al. | 322/61 |
| 8,513,924 B2 | * | 8/2013 | Horihata | 322/24 |
| 2008/0225565 A1 | | 9/2008 | Tsujimoto et al. | |
| 2011/0006710 A1 | | 1/2011 | Kondo et al. | |

(Continued)

FOREIGN PATENT DOCUMENTS

| | | |
|---|---|---|
| CN | 101001076 A | 7/2007 |
| JP | A-4-12686 | 1/1992 |

(Continued)

OTHER PUBLICATIONS

Office Action issued in Chinese Patent Application No. 201010226039.7 dated May 9, 2012 (with translation).

(Continued)

*Primary Examiner* — Nicholas Ponomarenko
(74) *Attorney, Agent, or Firm* — Oliff & Berridge, PLC (57) ABSTRACT

In a power generator, three-phase armature windings and a switching unit are provided for each phase armature winding. The switching unit includes a pair of a high-side switching element with a first diode and a second low-side switching element with a second diode. The switching unit rectifies, through at least one of the high-side switching element, the first diode, the second low-side switching element, and the second diode, a voltage induced in each phase armature winding. A zero-cross detector detects a point of time when a phase current based on the voltage induced in each phase armature winding is reversed in direction as a zero-cross point of the phase current. A determiner determines an off timing of the high-side switching element or the low-side switching element for each phase armature winding relative to the zero-cross point detected by the zero-cross detector.

14 Claims, 6 Drawing Sheets

(56) References Cited

U.S. PATENT DOCUMENTS

| | | | |
|---|---|---|---|
| 2011/0204856 A1* | 8/2011 | Horihata | 322/27 |
| 2011/0215773 A1* | 9/2011 | Iwai | 322/28 |
| 2012/0098556 A1 | 4/2012 | Miyazaki | |

FOREIGN PATENT DOCUMENTS

| | | |
|---|---|---|
| JP | A-8-298732 | 11/1996 |
| JP | A-09-312989 | 12/1997 |
| JP | A-11-155297 | 6/1999 |
| JP | B2-3239426 | 12/2001 |
| JP | A-2004-007964 | 1/2004 |
| JP | A-2005-204383 | 7/2005 |
| JP | A-2006-217780 | 8/2006 |
| JP | A-2008-228450 | 9/2008 |
| JP | A-2011-130615 | 6/2011 |

OTHER PUBLICATIONS

Jun. 20, 2013 Office Action issued in Chinese Patent Application No. 201010621113.5 (with translation).

Jan. 23, 2013 Office Action issued in U.S. Appl. No. 12/833,476.

Jun. 3, 2013 Notice of Allowance issued in U.S. Appl. No. 12/833,476.

Dec. 21, 2012 Office Action issued in Japanese Patent Application No. 2010-155568 (with translation).

Sep. 10, 2013 Japanese Office Action issued in Japanese Patent Application No. 2009-292954 (with translation).

* cited by examiner

POWER GENERATOR WITH IMPROVED CONTROLLABILITY OF PHASE OF PHASE CURRENT

CROSS REFERENCE TO RELATED APPLICATIONS

This application is based on Japanese Patent Application 2009-292954 filed on Dec. 24, 2009. This application claims the benefit of priority from the Japanese Patent Application, so that the descriptions of which are all incorporated herein by reference.

TECHNICAL FIELD

The present disclosure relates to a power generator for generating electrical power and/or moving power based on electromagnetic actions between at least one phase current and a magnetic field, and more particularly, to such a power generator for controlling the phase of the at least one phase current.

BACKGROUND

Three-phase inverters are operative to convert electrical power, such as three-phase voltages, generated from three-phase windings into DC (Direct-Current) power, such as a DC voltage using a plurality of switching elements each having a diode parallely connected thereto. The DC power is supplied to a battery to be charged therein, and/or to electrical loads.

One type of these three-phase inverters is operative to turn off a switching element for each phase armature winding after lapse of a preset delay time relative to a voltage induced in another phase armature winding. The one type of these three-phase inverters is disclosed in, for example, Japanese Patent Application Publication No. 2004-7964.

The three-phase inverter of this type is further operative to determine the off timings of the switching element for each phase armature winding so that an on period of the switching element for each phase armature winding varies from 120 electrical degrees to 180 electrical degrees.

SUMMARY

The inventors have discovered that there is a point that should be improved in a power generator, such as a three-phase rotary electric machine consisting of a rotor, a stator with three-phase armature windings, and a three-phase inverter disclosed in the patent publication No. 2004-7964.

Specifically, the three-phase inverter disclosed in the patent publication determines the off timings of the switching element for each phase armature winding relative to a voltage induced in another phase armature winding.

However, the three-phase inverter may not accurately control the phase of a phase current flowing through each phase armature winding.

Let us consider a case where the three-phase inverter tries to control the phase of a phase current for one-phase armature winding to thereby make longer an on period of the one-phase armature winding than a period during which the phase current can flow through the corresponding diode; this on period allows a current to flow from the battery to the one-phase armature winding during a preset period (a preset electrical-angular range).

In this case, the control of the phase of a phase current for one-phase armature winding, referred to as "phase control", requires the accurate relative position between the rotor and the stator (each phase armature winding). Thus, the phase control requires a component, such as a resolver, for detecting the rotational position of the rotor in order to carry out the phase control.

In other words, the three-phase rotary electric machine including the three-phase inverter disclosed in the patent publication cannot carry out the phase control unless it comprises a component for detecting the rotational position of the rotor.

Normal three-phase rotary electric machines as power generators are designed such that magnetic flux generated by the magnetically excited rotor induces a voltage in each phase armature winding. A current flowing through each phase armature winding also generates magnetic flux, and the magnetic flux generated by the current flowing through each phase armature winding has an influence on the voltage induced in each phase armature winding. To sum up, the voltage induced in each phase armature winding is affected by the current flowing therethrough.

The three-phase inverter disclosed in the patent publication is also operative to turn on each of the switching elements in synchronization with a conductive period during which a current can flow through a corresponding diode to thereby rectify the three-phase voltages to a DC voltage. This rectification will be referred to as "synchronous rectification".

When the three-phase inverter carries out the synchronous rectification while changing the on/off timings of each of the switching elements, there is not much change in the voltage induced in each phase armature winding.

However, as disclosed in the patent publication, when the three-phase inverter rectifies three-phase voltages to a DC voltage with the on period of each of the switching elements being set to be longer than or shifted from an on period during which a current flows through a corresponding diode, a current may flow into each phase armature winding from the battery during a period except for the on period of a corresponding diode, resulting in a significant change in the phase of the voltage generated in each phase armature winding.

This significant change in the phase of the voltage induced in each phase armature winding may make it difficult to accurately determine the off timings of the switching element for each phase armature winding relative to a voltage induced in another phase armature winding because of the significant change in the phase of the voltage induced in another phase armature winding.

In view of the circumstances set forth above, one of various aspects of the present invention seeks to provide power generators designed to address the point that should be improved in the power generator set forth above.

Specifically, an alternative of the various aspects of the present invention aims at providing a power generator capable of accurately controlling the phase of a current flowing through one phase armature winding of the power generator without using components for detecting the rotational position of a rotor of the power generator.

According to one aspect of the present invention, there is provided a power generator. The power generator includes at least two-phase armature windings, and a switching unit including, for each of the at least two-phase armature windings, a pair of a high-side switching element with a first diode parallely connected thereto and a second low-side switching element with a second diode parallely connected thereto. The switching unit is configured to rectify, through at least one of the high-side switching element, the first diode, the second low-side switching element, and the second diode, a voltage induced in each of the at least two-phase armature windings. The power generator includes a zero-cross detector that detects a point of time when a phase current based on the voltage induced in each of the at least two-phase armature windings is reversed in direction as a zero-cross point of the phase current, and a determiner that determines an off timing of at least one of the high-side switching element and the low-side switching element for each of the at least two-phase armature windings relative to the zero-cross point detected by the zero-cross detector.

According to another aspect of the present invention, there is provided a power generator. The power generator includes at least two-phase armature windings, and a switching unit including, for each of the at least two-phase armature windings, a pair of a high-side switching element with a first diode parallely connected thereto and a second low-side switching element with a second diode parallely connected thereto. The switching unit is configured to rectify, through at least one of the high-side switching element, the first diode, the second low-side switching element, and the second diode, a voltage induced in each of the at least two-phase armature windings. The power generator includes a phase detector that directly detects a phase of a phase current, the phase current being generated based on the voltage induced in each of the at least two-phase armature windings. The power generator includes a controller configured to operate, in a phase control mode, to turn on each of the high-side switching element and the low-side switching element within an on period. The on period being delayed since a start of a conductive period of a corresponding one of the first and second diodes. The on period of each of the high-side switching element and the low-side switching element is determined based on the detected phase of the phase current.

According to a still further aspect of the present invention, there is provided a power generator includes a rotor including a field winding, and at least two-phase armature windings. When the field winding is energized with the rotor being rotated to generate a rotating magnetic field, the at least two-phase armature winding is configured to generate electrical power based on the generated rotating magnetic field as output power of the power generator. The power generator includes a switching unit including, for each of the at least two-phase armature windings, a pair of a high-side switching element with a first diode parallely connected thereto and a second low-side switching element with a second diode parallely connected thereto. The switching unit is configured to rectify, through at least one of the high-side switching element, the first diode, the second low-side switching element, and the second diode, a voltage induced in each of the at least two-phase armature windings. The power generator includes a voltage regulator having a switching element connected with the field winding, the voltage regulator being configured to control a duty cycle of the switching element to thereby regulate the output power of the power generator. The power generator includes a controller configured to:

operate, if a rotational speed of the rotor is higher than a first preset value and lower than a second preset value higher than the first preset value, and a value of the duty cycle of the switching element is equal to or higher than a preset value, in a phase control mode to turn on each of the high-side switching element and the low-side switching element within an on period, the on period being delayed since a start of a conductive period of a corresponding one of the first and second diodes; and operate, if at least one of: the rotational speed of the rotor is equal to or lower than the first preset value, the rotational speed of the rotor is equal to or higher than the second preset value, and the value of the duty cycle of the switching element is lower than the preset value, in a synchronous control mode to turn on and off each of the high-side switching element and the low-side switching element such that the on period of each of the high-side switching element and the low-side switching element is within the conductive period of a corresponding one of the first and second diodes.

The above and/or other features, and/or advantages of various aspects of the present invention will be further appreciated in view of the following description in conjunction with the accompanying drawings. Various aspects of the present invention can include and/or exclude different features, and/or advantages where applicable. In addition, various aspects of the present invention can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the invention will become apparent from the following description of embodiments with reference to the accompanying drawings in which.

DETAILED DESCRIPTION OF EMBODIMENTS OF THE INVENTION

Embodiments of the present invention will be described hereinafter with reference to the accompanying drawings. In the drawings, identical reference characters are utilized to identify identical corresponding components.

First Embodiment

Figure 1:
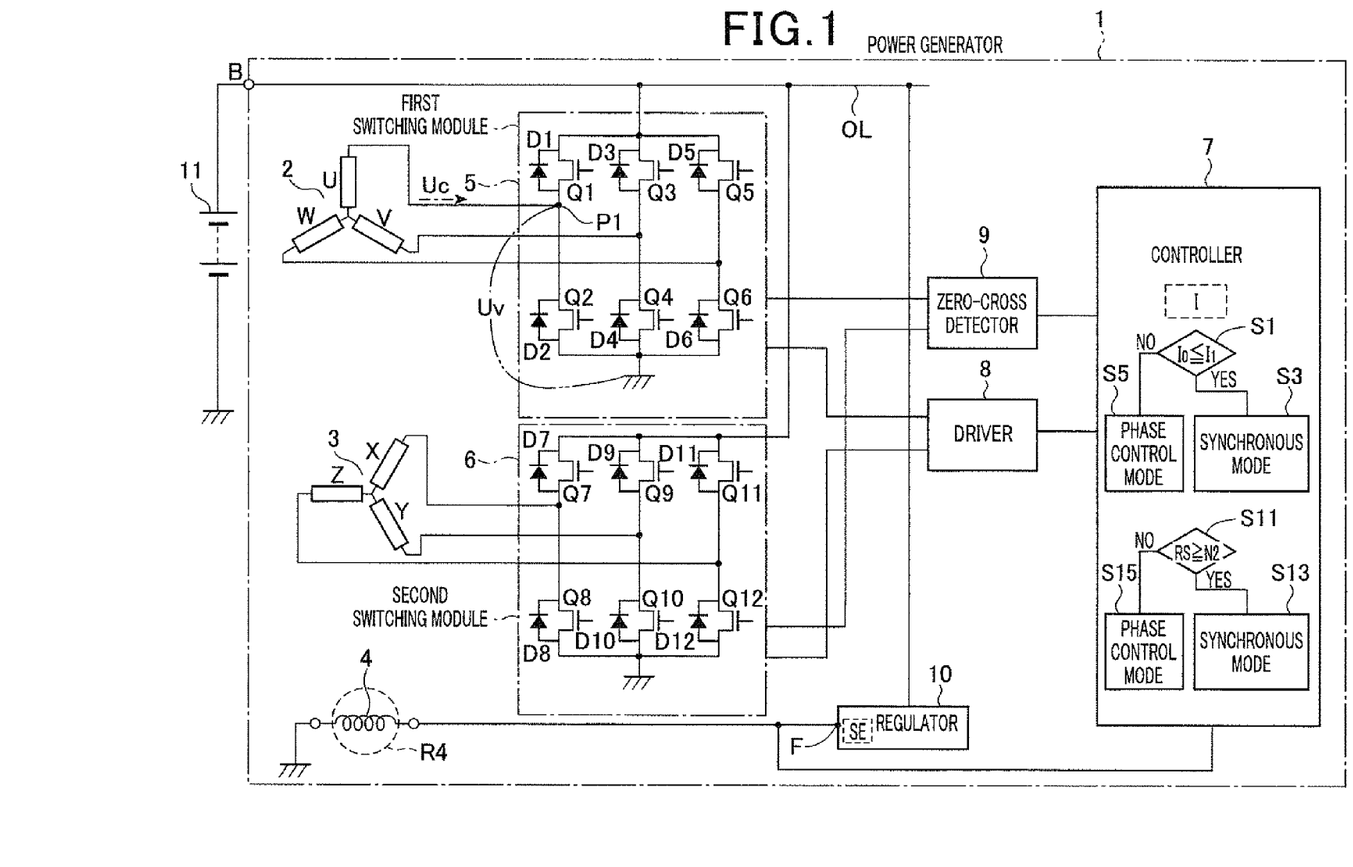
FIG. 1 is a circuit diagram schematically illustrating an example of the system configuration of a power generator according to the first embodiment of the present invention.

Referring to the drawings, particularly to FIG. 1, there is illustrated a power generator 1 according to the first embodiment of the present invention. In this embodiment, the present invention is applied to a three-phase power generator 1 installed in a motor vehicle.

The power generator 1 includes first armature windings 2, second armature windings 3, a rotor 4M including a field winding 4, a pair of first and second switching units 5 and 6, a controller (determiner) 7, a driver 8, a zero-cross detector 9, and a voltage regulator 10.

The power generator 1 works to convert an alternating-current (AC) voltage induced in each of the first and second armature windings 2 and 3 into a DC voltage via a corresponding one of the first and second switching units 5 and 6, and supply the DC voltage to a battery 11 to charge it therein, and/or the DC voltage to electrical loads installed in the motor vehicle. The power generator 1 also works to convert a DC voltage supplied from the battery 11 into a three-phase AC voltage via the first and second switching units 5 and 6, and apply the three-phase AC voltage to each of the first and second armature windings 2 and 3 to thereby generate rotary power (torque) to rotate the rotor 4M. For example, the rotor 4M is directly or indirectly coupled to a crankshaft of an internal combustion engine installed in the motor vehicle so that the generated rotary power turns the crankshaft of the internal combustion engine.

The first armature windings 2 are for example multiphase armature windings, such as three-phase armature windings. The first armature windings 2 are wound in and around an armature core to constitute a first armature. For example, the armature core has an annular shape in its lateral cross section, and a plurality of slots formed therethrough and circumferentially arranged at given pitches. The first armature windings 2 are wound in the slots of the armature core.

Similarly, the second armature windings 3 are for example multiphase armature windings, such as three-phase armature windings. The second armature windings 3 are wound in and around, for example, the armature core to constitute a second armature. For example, the second armature windings 3 are wound in the slots of the armature core such that the first armature windings 2 and the second armature windings 3 have a phase shift of 30 electrical degrees ($\pi/6$ radians) therebetween.

Specifically, in this embodiment, each set of the first and second multiphase armature windings 2 and 3 is a set of three-phase armature windings. The first three-phase armature windings 2 consist of U-, V-, and W-phase windings, which are connected in, for example, a star configuration. The U-, V-, and W-phase windings each have one end connected to a common junction (neutral point), and the other end to a separate terminal. Similarly, the second three-phase armature windings 3 consist of X-, Y-, and Z-phase windings, which are connected in, for example, a star configuration. The X-, Y-, and Z-phase windings each have one end connected to a common junction (neutral point), and the other end to a separate terminal.

The rotor 4M is attached to, for example, a rotary shaft (not shown) and, for example, rotatably disposed within the armature core. One end of the rotary shaft is linked to directly or indirectly to the crankshaft of the internal combustion engine such that the rotor 4M and the rotary shaft are rotatably driven by the internal combustion engine (engine). In other words, rotation of the rotor 4M can be transferred to the crankshaft of the engine as rotary power so that the crankshaft can be rotated by the rotary power.

The rotor 4M includes a plurality of field poles and a field winding 4 wound in the rotor 4M. The field winding 4 is electrically connected with the voltage regulator 10 via slip rings and the like. When energized by the voltage regulator 10, the field winding 4 magnetizes the plurality of field poles with their alternative north and south polarities to thereby generate a rotor magnetic field. Note that, as the rotor 4M, a rotor comprising permanent magnets or a salient-pole rotor for generating a rotor magnetic field can be used.

The first switching unit 5 is disposed between the first three-phase armature windings 2 and the battery 11, and constitutes a bridge arm comprised of a plurality of upper arm switches and a plurality of lower arm switches, each of upper and lower arm switches consists of a switching element and a diode parallely connected therewith.

Specifically, the first switching unit 5 is comprised of a first pair (bridge arm) of series-connected high- and low-side switching elements Q1 and Q2, a second pair (bridge arm) of series-connected high- and low-side switching elements Q3 and Q4, and a third pair (bridge arm) of series-connected high- and low-side switching elements Q5 and Q6. The first switching unit 5 is also comprised of diodes D1, D2, D3, D4, D5, and D6 electrically connected in parallel to the switching elements Q1, Q2, Q3, Q4, Q5, and Q6, respectively.

The cathode of each of the diodes D1, D2, D3, D4, D5, and D6 is connected with the drain (collector) of a corresponding one of the switching elements Q1, Q2, Q3, Q4, Q5, and Q6, and the anode thereof is connected with the source (emitter) of a corresponding one of the switching elements Q1, Q2, Q3, Q4, Q5, and Q6.

The first, second, and third pairs of switching elements Q1 and Q2, Q3 and Q4, and Q5 and Q6 are parallely connected with each other in bridge configuration.

The high-side switching elements Q1, Q3, and Q5 each have one end connected as a common connection terminal (first DC terminal), and the common connection terminal is connected with the positive electrode of the battery 11 via an output line OL and a terminal B; these electrical loads are electrically connected with the output line OL. The low-side switching elements Q2, Q4, and Q6 have each one end connected as a common connection terminal (second DC terminal), and the common connection terminal is grounded. The high-side switching elements Q1, Q3, and Q5 each have the other end connected, at a terminal (AC terminal), with the other end of a corresponding one of the low-side switching elements Q2, Q4, and Q6.

The AC terminal between the high- and low-side switching elements Q1 and Q2 is connected with the separate terminal of the U-phase winding, the AC terminal between the high- and low-side switching elements Q3 and Q4 is connected with the separate terminal of the V-phase winding, and the AC terminal between the high- and low-side switching elements Q5 and Q6 is connected with the separate terminal of the W-phase winding.

Similarly, the second switching unit 6 is disposed between the second three-phase armature windings 3 and the battery 11, and constitutes a bridge arm comprised of a plurality of upper arm switches and a plurality of lower arm switches, each of upper and lower arm switches consists of a switching element and a diode parallely connected therewith.

Specifically, the second switching unit 6 is comprised of a first pair (bridge arm) of series-connected high- and low-side switching elements Q7 and Q8, a second pair (bridge arm) of series-connected high- and low-side switching elements Q9 and Q10, and a third pair (bridge arm) of series-connected high- and low-side switching elements Q11 and Q12. The second switching unit 6 is also comprised of diodes D7, D8, D9, D10, D11, and D12 electrically connected in parallel to the switching elements Q7, Q8, Q9, Q10, Q11, and Q12, respectively.

The cathode of each of the diodes D7, D8, D9, D10, D11, and D12 is connected with the drain (collector) of a corresponding one of the switching elements Q7, Q8, Q9, Q10, Q11, and Q12, and the anode thereof is connected with the source (emitter) of a corresponding one of the switching elements Q7, Q8, Q9, Q10, Q11, and Q12.

The first, second, and third pairs of switching elements Q7 and Q8, Q9 and Q10, and Q11 and Q12 are parally connected with each other in bridge configuration.

The high-side switching elements Q7, Q9, and Q11 each have one end connected as a common connection terminal (first DC terminal), and the common connection terminal is connected with the positive electrode of the battery 11 via the output line OL and the terminal B. The low-side switching elements Q8, Q10, and Q12 have each one end connected as a common connection terminal (second DC terminal), and the common connection terminal is grounded. The high-side switching elements Q7, Q9, and Q11 each have the other end connected, at a terminal (AC terminal), with the other end of a corresponding one of the low-side switching elements Q8, Q10, and Q12.

The AC terminal between the high- and low-side switching elements Q7 and Q8 is connected with the separate terminal of the X-phase winding, the AC terminal between the high- and low-side switching elements Q9 and Q10 is connected with the separate terminal of the Y-phase winding, and the AC terminal between the high- and low-side switching elements Q11 and Q12 is connected with the separate terminal of the Z-phase winding.

As the switching elements Q1 to Q12, power MOSFETs are preferably used because they have lower loss as compared with diodes used for normal rectifiers. When power MOSFETs are used as the switching elements Q1 to Q12, intrinsic diodes of the power MOSFETs can be used as the diodes D1 to D12, thus eliminating the discrete components of the diodes. Another type of switching elements can be used as the switching elements Q1 to Q12.

The zero-cross detector (phase detector) 9 is connected with the controller 7 and with, for example, the first DC terminal, the second DC terminal, and the AC terminals of the respective pairs of high- and low-side switching elements Q1 and Q2, Q3 and Q4, Q5 and Q6, Q7 and Q8, Q9 and Q10, and Q11 and Q12. The zero-cross detector 9 is operative to detect, during a switching element being on, a point of time when a phase current flowing through the switching element and/or a corresponding diode parallely connected therewith is reversed in direction. In other words, the zero-cross detector 9 is operative to detect, during a switching element being on, a point of time when the waveform of a phase current flowing through the switching element and/or a corresponding diode parallely connected therewith crosses zero. This point of time corresponding to a switching element being in on state will be referred to as a "zero-cross point of a switching element" hereinafter.

For example, the zero-cross detector 9 is operative to detect, during the switching element Q1 being on, a point of time when a phase current flowing through the switching element Q1 and/or the diode D1 is reversed in direction. The zero-cross detector 9 is operative to carry out the zero-cross detection for individually each of the upper and lower arm switches, and output, to the controller 7, information indicative of the zero-cross point each time a phase current flowing through an upper or lower arm switch is reversed in direction.

The controller 7 is communicably connected with the driver 8. The controller 7 is operative to determine on and off timings of each of the switching elements Q1 to Q12 based on the information outputted from the zero-cross detector 9. The driver 8 is electrically connected with a control terminal (gate or base) of each of the switching element Q1 to Q12, and operative to individually drive each of the switching elements Q1 to Q12 according to the determined on and off timings for a corresponding one of the switching elements Q1 to Q12. The controller 7 can be designed as a computer circuit (programmed logic circuit) consisting essentially of, for example, a CPU, an I/O interface, and a memory unit for running a prepared control program(s) to deter mine on and off timings of each of the switching elements Q1 to Q12. The controller 7 can be designed as a hard-wired logic circuit or a hybrid circuit comprised of a hard-wired logic circuit and a programmed logic circuit.

The voltage regulator 10 has an F terminal and is equipped with a switching element SE with a diode parallely connected therewith. The switching element SE is electrically connected between the field winding 4 through the F terminal and the output line OL. The voltage regulator 10 is operative to regulate the voltage on the output line OL to a preset target level, for example, slightly higher than the rated voltage of the battery 11. When the switching element SE is in on state, a field current flows through the filed winding 4 based on the voltage on the output line BL of the power generator 1 so that the voltage on the output line BL is reduced. In contrast, when the switching element SE is in off state, the field current continues to flow through the diode with the voltage on the output line BL being substantially kept unchanged. Based on the characteristics of the switching element SE, the voltage regulator 10 is operative to intermittently drive the switching element SE while adjusting an on period (duty cycle) of the switching element SE to thereby regulate the battery voltage VB at the target level.

Next, operations of the power generator 1 according to this embodiment will be described.

In the power generator 1, when the field winding 4 is intermittently energized by the voltage regulator 10 while the rotor 4M rotates, the rotating field winding 4 creates magnetic flux. The created magnetic flux magnetizes the plurality of field poles.

The rotation of the plurality of filed poles creates magnetic flux, and the created magnetic flux induces a three-phase AC voltage in each of the first and second three-phase armature windings 2 and 3. Each of the first and second switching units 5 and 6 carries out rectification of the three-phase AC voltage induced in each of the first and second armature windings 2 and 3 to generate a direct current (DC) voltage, and the generated DC voltage is outputted through the output line OL so that the outputted DC voltage is supplied to the battery 11 to charge it, and to the electrical loads. The outputted DC voltage of the power generator 1 depends on a rotational speed of the rotor 4M and the amount of the field current to be supplied to the field winding 4.

As described above, because the diodes D1 to D6 included in the first switching unit 5 are parally connected with the respective switching elements Q1 to Q6, even if the switching elements Q1 to Q6 are off state, one phase current based on the three-phase AC voltage flows through each of the diodes D1 to D6 as long as a corresponding one phase voltage induced in each phase armature winding is greater than the battery voltage VB, so that the three-phase AC voltage is rectified. The same appears in the second switching unit 6. A period during which one phase current can flow through a diode as long as a corresponding phase voltage is higher than the battery voltage VB will be referred to as a "conductive period" of the diode.

The controller 7 according to this embodiment for example uses the following two operation modes: "synchronous control mode" and "phase control mode".

Specifically, in the synchronous control mode, the controller 7 turns on each of the switching elements Q1 to Q12 in synchronization with the conductive period of a corresponding diode. This operation of the controller 7 in the synchronous control mode will be referred to as a "synchronous control task".

In the phase control mode, the controller 7 turns on each of the switching elements Q1 to Q12 after the start of the conductive period of a corresponding diode. This allows, even if one phase voltage is lower than the battery voltage VB, current to be drawn from the battery 11 through a corresponding one of the switching elements Q1 to Q12. This operation of the controller 7 in the phase control mode will be referred to as a "phase control task".

The comparison between the synchronous control task and the phase control task shows that the power generation efficiency of the power generator 1 in the synchronous control mode is higher than that of the power generator 1 in the phase control mode, and the amount of the output current of the power generator 1 in the phase control mode is greater than that of the output current of the power generator 1 in the synchronous control mode.

Thus, it is preferable that the controller 7 carries out the synchronous control task if either the total value of the power requirements of the electrical loads is relatively low (lower than a first preset threshold) so that a value of the output current is smaller than a first preset value or the rotational speed of the rotor 4M is relatively high (higher than a second preset threshold).

On the other hand, it is preferable that the controller 7 carries out the phase control task if the total value of the power requirements of the electrical loads is relatively high (higher than the first preset threshold with the rotational speed of the rotor 4M being relatively low (lower than the second preset threshold).

Figure 2:
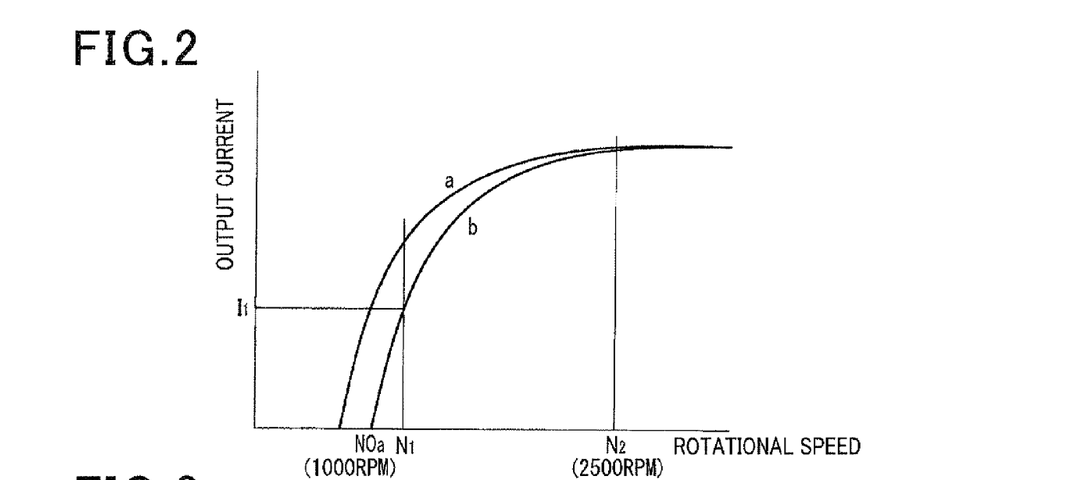
FIG. 2 is a graph schematically illustrating a first reference output characteristic curve "a" of the power generator and a second reference output characteristic curve "b" of the power generator illustrated in FIG. 1.

In order to effectively switch the synchronous control mode and the phase control mode, the controller 7 stores therein information I including a first reference output characteristic curve "a" representing a relationship between a variable of the output current and a variable of the rotational speed of the rotor 4M; this first reference output characteristic curve "a" has been obtained in a case where the power generator 1 has carried out the synchronous control task (see FIG. 2).

The information I stored in the controller 7 includes a second reference output characteristic curve "b" representing a relationship between a variable of the output current and a variable of the rotational speed of the rotor 4M; this second reference output characteristic curve "b" has been obtained in a case where the power generator 1 has carried out the phase control task (see FIG. 2). In this graph of FIG. 2, the horizontal axis represents a variable of the rotational speed of the rotor 4M, and the vertical axis represents a variable of the output current of the power generator 1. The information I can have been obtained by, for example, experiments and/or simulations using the power generator 1 itself and/or a computer model functionally equivalent thereto.

In this embodiment, the rotational speed of the rotor 4M can be detected by the controller 7 based on the information, supplied from the zero-cross detector 9, indicative of the zero-cross point each time a phase current flowing through an upper or lower arm switch is reversed in direction described later.

Specifically, the controller 7 is designed to carry out the synchronous control task in accordance with the information I if a value of the output current Io is equal to or smaller than a preset value I1, as the first preset threshold, corresponding to a value N1 of the rotational speed of the rotor 4M on the second reference output characteristic curve "b" (see "YES" in step S1 and S3 in FIG. 1). Otherwise, if a value of the output current Io is greater than the preset value I1 corresponding to the value N1 of the rotational speed of the rotor 4M on the second reference output characteristic curve "b", the controller 7 is designed to carry out the phase control task (see "NO" in step S1 and S5 in FIG. 1).

In addition, the controller 7 is designed to carry out the synchronous control task in accordance with the information I if a value of the rotational speed RS of the rotor 4M is equal to or higher than a preset value N2, such as 2500 RPM, as the second preset threshold, on the first reference output characteristic curve "a" (see "YES in step S11 and S13 in FIG. 1). The preset value N2 of the rotational speed of the rotor 4M allows the power generator 1 operating in the synchronous control mode to obtain a sufficient level of the output current. Otherwise, if a value of the rotational speed RS of the rotor 4M is lower than the preset value N2 on the first reference output characteristic curve "a", the controller 7 is designed to carry out the phase control task (see "NO in step S11 and S15 in FIG. 1).

In other words, a value of the output current, which will be obtained by the power generator 1 at the preset value N2 of the rotational speed of the rotor 4M if the power generator 1 operates in the synchronous control mode, is substantially in agreement with a value of the output current, which will be obtained by the power generator 1 at the preset value N2 of the rotational speed of the rotor 4M if the power generator 1 operates in the phase control mode.

Next, how to determine, based on the information outputted form the zero-cross detector 9, on and off timings of each of the switching elements Q1 to Q12 under control of the controller 7 in each of the synchronous control mode and the phase control mode will be described hereinafter.

Synchronous Control Mode

Figure 3:
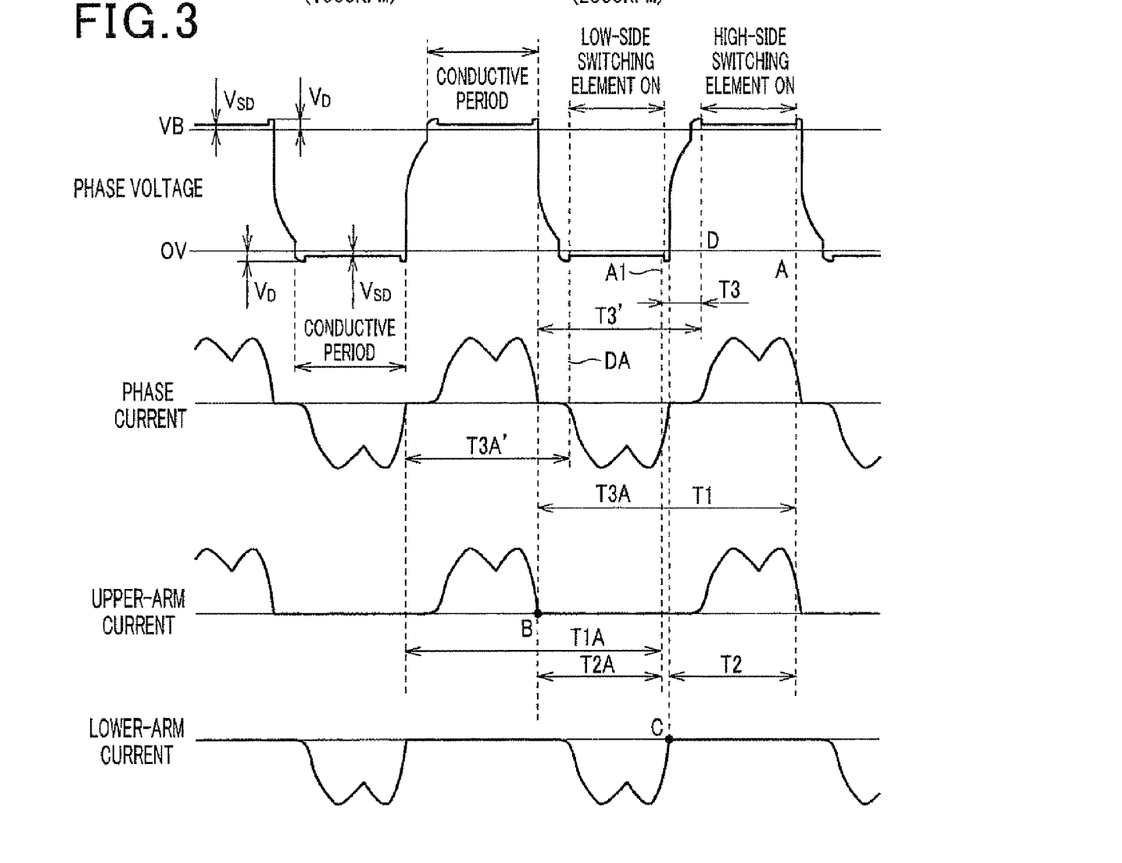
FIG. 3 is a view schematically illustrating a waveform of a U-phase voltage induced in a U-phase winding and a waveform of a U-phase current flowing through the U-phase winding as a result of rectification of a three-phase AC voltage by the power generator in a synchronous control mode.

FIG. 3 schematically illustrates a waveform of a U-phase voltage Uv induced in a U-phase winding and a waveform of a U-phase current Uc flowing through the U-phase winding as a result of the rectification of a three-phase AC voltage by the power generator 1 in the synchronous control mode (see FIG. 1). The waveform of the U-phase voltage Uv and that of the U-phase current Uc are as examples of the waveforms of three-phase voltages induced in the first armature windings 2 and those of three-phase currents flowing through the respective first armature windings 2. Note that the U-phase voltage Uv is the potential difference between ground and a point P1 corresponding to the AC terminal between the high- and low-side switching elements Q1 and Q2 (see FIG. 1).

Because the common connection terminal (the first DC terminal) of the high-side switching elements Q1, Q3, and Q5 is clamped to the battery voltage VB, while the U-phase voltage Uv induced in the U-phase winding is higher than the battery voltage VB, the diode D1 is within the conductive period so that the U-phase current Uc can flow through the diode D1, resulting in that the U-phase voltage Uv is clamped to substantially the sum of the battery voltage VB and a forward voltage $V_D$ of the diode D1 (see "conductive period" in FIG. 3).

Similarly, because the common connection terminal (the second DC terminal) of the low-side switching elements Q2, Q4, and Q6 is clamped to ground (0 volts), while the U-phase voltage Uv induced in the U-phase winding is lower than 0 volts, the diode D2 is within the conductive period so that the U-phase current Uc can flow through the diode D2, resulting in that the U-phase voltage Uv is clamped to substantially the sum of the 0 volts (ground level) and a negative forward voltage $-V_D$ of the diode D2 (see "conductive period" in FIG. 3).

The U-phase current Uc can be divided into a current component (upper-arm current) that flows through the high-side switching element Q1 and the diode D1, and a current component (lower-arm current) that flows through the low-side switching element Q2 and the diode D2.

In this embodiment, the controller 7 in the synchronous control mode determines on and off timings of the high-side switching element Q1 such that each on period of the high-side switching element Q1 is within a corresponding conductive period of the diode D1, and similarly determines on and off timings of the low-side switching element Q2 such that each on period of the low-side switching element Q2 is within a corresponding conductive period of the diode D2.

Determination of Off Timings of the High-Side Switching Element Q1

More specifically, the controller 7 in the synchronous control mode can determine the off timing (A) of a present on-state of the high-side switching element Q1 to a point of time after the lapse of a preset time T1 since a zero-cross point (B, see FIG. 3) of the previous on-state of the same high-side switching element Q1. In addition, the controller 7 in the synchronous control mode can determine the off timing (A) of a present on-state of the high-side switching element Q1 to a point of time after the lapse of a preset time T2 since a zero-cross point (C, see FIG. 3) of an on-state of the low-side switching element Q2 immediately before the present on-state of the high-side switching element Q1.

Each of the preset times T1 and T2 can be represented by a corresponding electrical angle. In order to calculate an electrical angle corresponding to either the preset time T1 or T2, the controller 7 needs to detect an angular change of the rotor 4M within either the preset time T1 or T2. Thus, the controller 7 according to this embodiment can be designed to detect a rotational speed (an angular change rate) of the rotor 4M based on any one of: at least one interval between at least one pair of adjacent zero-cross points of the upper-arm current; and at least one interval between at least one pair of adjacent zero-cross points of each of the upper-arm current and the lower-arm current. Based on the detected rotational speed, the controller 7 according to this embodiment can be designed to determine an electric angle corresponding to either the preset time T1 or T2.

For example, the controller 7 can monitor at least three intervals each between a corresponding pair of adjacent zero-cross timings to thereby grasp the fluctuations in the rotational speed of the rotor 4M. Thus, the controller 7 can determine, based on the grasped fluctuations in the rotational speed of the rotor 4M, an electric angle corresponding to each of the preset time T1 or T2. This can increase the accuracy of determining the off timings of the high-side switching element Q1.

In the same procedure as the determination of the off timings of the high-side switching element Q1, the controller 7 in the synchronous control mode can determine the off timing (A1) of a present on-state of the low-side switching element Q2 to a point of time after the lapse of a preset time T1A since a zero-cross point of the previous on-state of the same low-side switching element Q2. In addition, the controller 7 in the synchronous control mode can determine the off timing (A1) of a present on-state of the low-side switching element Q2 to a point of time after the lapse of a preset time T2A since a zero-cross point of an on-state of the high-side switching element Q1 immediately before the present on-state of the low-side switching element Q2.

Determination of On Timings of the High-Side Switching Element Q1

The controller 7 in the synchronous control mode can determine a present on timing (D) of the high-side switching element Q1 to a point of time after the lapse of a preset time T3 since a zero-cross point (C, see FIG. 3) of an on-state of the low-side switching element Q2 immediately before the present on timing to be determined. As well as the off timings, the controller 7 according to this embodiment can be designed to detect the rotational speed (an angular change rate) of the rotor 4M based on any one of: at least one interval between at least one pair of adjacent zero-cross points of the upper-arm current; and at least one interval between at least one pair of adjacent zero-cross points of each of the upper-arm current and the lower-arm current. Based on the detected rotational speed, the controller 7 according to this embodiment can be designed to determine an electric angle corresponding to the preset time T3, making it possible to increase the accuracy of determining the on timings of the high-side switching element Q1. In addition, as well as the off timings, the controller 7 can determine, based on the grasped fluctuations in the rotational speed of the rotor 4M, an electric angle corresponding to the preset time T3, thus increasing the accuracy of determining the on timings of the high-side switching element Q1.

In the same procedure as the determination of the on timings of the high-side switching element Q1, the controller 7 in the synchronous control mode can determine a present on timing (DA) of the low-side switching element Q2 to a point of time after the lapse of a preset time T3A since a zero-cross point of an on-state of the high-side switching element Q1 immediately before the present on timing to be determined.

During the high-side switching element Q1 being on, the U-phase current Uc mainly flows through the high-side switching element Q1 because it can flow through the high-side switching element Q1 easier than through the diode D1, resulting in that the U-phase voltage Uv is clamped to substantially the sum of the battery voltage VB and a source-drain voltage $V_{SD}$ of the high-side switching element Q1 being on (see "HIGH-SIDE SWITCHING ELEMENT ON" in FIG. 3).

Similarly, during the low-side switching element Q2 being on, the U-phase current Uc mainly flows through the low-side switching element Q2 because it can flow through the low-side switching element Q2 easier than through the diode D2, resulting in that the U-phase voltage Uv is clamped to substantially the sum of 0 volts (ground level) and a source-drain voltage $V_{SD}$ of the low-side switching element Q2 being on (see "LOW-SIDE SWITCHING ELEMENT ON" in FIG. 3).

As another measure to determine on timings of the high-side switching element Q1, the controller 7 in the synchronous control mode can determine a present on timing (D) of the high-side switching element Q1 to a point of time after the lapse of a preset time T3' since a zero-cross point (B, see FIG.

3) of the previous on-state of the same high-side switching element Q1. Similarly, as another measure to determine on timings of the low-side switching element Q2, the controller 7 in the synchronous control mode can determine a present on timing (D1) of the low-side switching element Q2 to a point of time after the lapse of a preset time T3A' since a zero-cross point of the previous on-state of the same low-side switching element Q2.

Because on and off timings of each pair of the high- and low-side switching elements Q3 and Q4 and of the high- and low-side switching elements Q5 and Q6 can be determined in the same procedures of determination of the on and off timings of the high- and low-side switching elements Q1 and Q2 set forth above, they can be eliminated in description.

Similarly, because on and off timings of each pair of: the high- and low-side switching elements Q7 and Q8, the high- and low-side switching elements Q9 and Q10, and the high- and low-side switching elements Q11 and Q12 can be determined in the same procedures of determination of the on and off timings of the high- and low-side switching elements Q1 and Q2 set forth above, they can be eliminated in description.

Phase Control Mode

Figure 4:
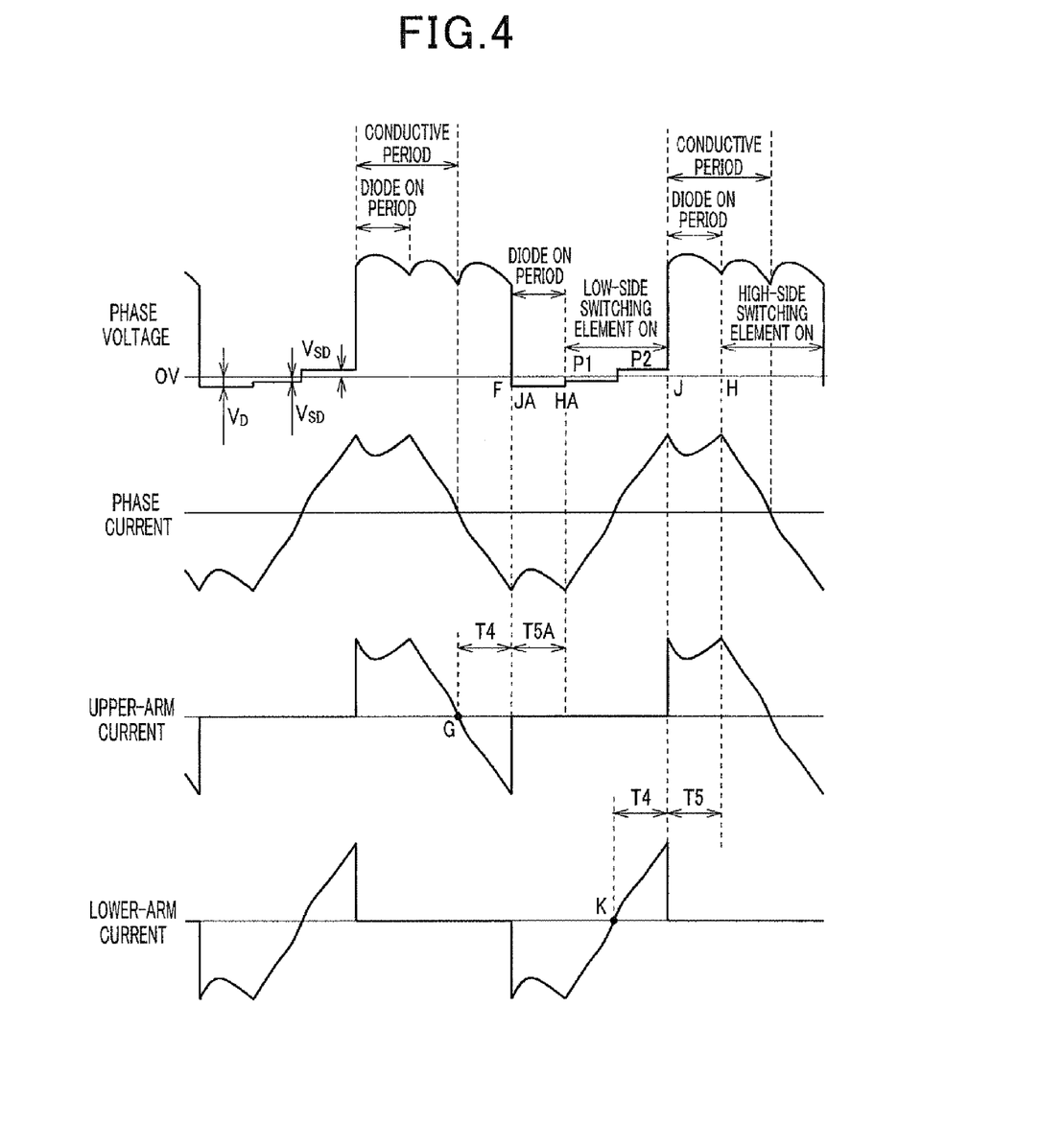
FIG. 4 is a view schematically illustrating a waveform of a U-phase voltage induced in a U-phase winding and a waveform of a U-phase current flowing through the U-phase winding as a result of rectification of a three-phase AC voltage by the power generator in a phase control mode.

FIG. 4 schematically illustrates a waveform of a U-phase voltage Uv induced in a U-phase winding and a waveform of a U-phase current Uc flowing through the U-phase winding as a result of the rectification of a three-phase AC voltage by the power generator 1 in the phase control mode (see FIG. 1). The waveform of the U-phase voltage Uv and that of the U-phase current Uc are as examples of the waveforms of three-phase voltages induced in the first armature windings 2 and those of three-phase currents flowing through the respective first armature windings 2.

In this embodiment, the controller 7 in the phase control mode determines on and off timings of the high-side switching element Q1 such that the start of each on period of the high-side switching element Q1 is delayed relative to that of a corresponding conductive period of the diode D1, and similarly determines on and off timings of the low-side switching element Q2 such that the start of each on period of the low-side switching element Q2 is delayed relative to that of a corresponding conductive period of the diode D2.

Determination of Off Timings of the High-Side Switching Element Q1

The controller 7 in the phase control mode can determine the off timing (F) of a present on-state of the high-side switching element Q1 to a point of time after the lapse of a preset time T4 since a zero-cross point (G, see FIG. 4) within the present on-state of the same high-side switching element Q1. The preset time T4 is determined beforehand depending on the battery voltage VB and the present total value of the power requirements of the electrical loads.

That is, the controller 7 in the phase control mode can determine the off timing (F) of a present on-state of the high-side switching element Q1 to a point of time after the lapse of the preset time T4 since the end of a corresponding conductive period of the diode D1.

As well as determination of the on and off timings in the synchronous mode, the controller 7 according to this embodiment can be designed to detect the rotational speed (an angular change rate) of the rotor 4M based on any one of: at least one interval between at least one pair of adjacent zero-cross points of the upper-arm current; and at least one interval between at least one pair of adjacent zero-cross points of each of the upper-arm current and the lower-arm current. Based on the detected rotational speed, the controller 7 according to this embodiment can be designed to determine an electric angle corresponding to the preset time T4, making it possible to increase the accuracy of determining the off timings of the high-side switching element Q1. In addition, as well as determination of the on and off timings in the synchronous mode, the controller 7 can determine, based on the grasped fluctuations in the rotational speed of the rotor 4M, an electric angle corresponding to the preset time T4, thus increasing the accuracy of determining the off timings of the high-side switching element Q1.

In the same procedure as the determination of the off timings of the high-side switching element Q1, the controller 7 in the phase control mode can determine the off timing (J) of a present on-state of the low-side switching element Q2 to a point of time after the lapse of the preset time T4 since a zero-cross point (K, see FIG. 4) within the present on-state of the same low-side switching element Q2.

That is, the controller 7 in the phase control mode can determine the off timing (J) of a present on-state of the low-side switching element Q2 to a point of time after the lapse of the preset time T4 since the end of a corresponding conductive period of the diode D2.

Determination of On Timings of the High-Side Switching Element Q1

The controller 7 in the phase control mode can determine a present on timing (H) of the high-side switching element Q1 to a point of time after the lapse of a preset time T5 since the off timing (J) of the low-side switching element Q2 immediately before the present on timing to be determined.

That is, the controller 7 in the phase control mode can determine a present on timing (H) of the high-side switching element Q1 to a point of time after the lapse of the preset time T5 since the start of a corresponding conductive time of the diode D1. In other words, the controller 7 in the phase control mode can delay the turning on of the high-side switching element Q1 by the preset time T5 relative to the start of an on period of the diode D1.

The preset time T5 serves as a margin that allows the low-side switching element Q2 to be reliably turned off, and therefore, functions as a measure to prevent the high- and low-side switching elements Q1 and Q2 from short-circuiting to each other. Thus, the length of the preset time T5 is preferably set to be as short as possible for reduction of loss.

As well as the off timings, the controller 7 according to this embodiment can be designed to detect the rotational speed (an angular change rate) of the rotor 4M based on any one of: at least one interval between at least one pair of adjacent zero-cross points of the upper-arm current; and at least one interval between at least one pair of adjacent zero-cross points of each of the upper-arm current and the lower-arm current. Based on the detected rotational speed, the controller 7 according to this embodiment can be designed to determine an electric angle corresponding to the preset time T5, making it possible to increase the accuracy of determining the on timings of the high-side switching element Q1. In addition, as well as the off timings, the controller 7 can determine, based on the grasped fluctuations in the rotational speed of the rotor 4M, an electric angle corresponding to the preset time T5, thus increasing the accuracy of determining the on timings of the high-side switching element Q1.

Because the off timing (J) of the low-side switching element Q2 immediately before the present on timing (H) to be deter mined is the point of time after the lapse of the preset time T4 since the zero-cross point (K) within the same on-state of the same low-side switching element Q2, the controller 7 in the phase control mode can determine the present on timing (H) of the high-side switching element Q1 to the point of time after the lapse of the sum of the preset times T4 and T5 since the zero-cross point (K) of the low-side switching element Q2 immediately before the present on timing (H) to be determined.

In the same procedure as the determination of the on timings of the high-side switching element Q1, the controller 7 in the phase control mode can determine a present on timing (HA) of the low-side switching element Q2 to a point of time after the lapse of a preset time T5A since an off timing (JA) of the low-side switching element Q2 immediately before the present on timing (HA) to be determined.

That is, the controller 7 in the phase control mode can determine a present on timing (HA) of the low-side switching element Q2 to a point of time after the lapse of the preset time T5A since the start of a corresponding conductive time of the diode D2. In other words, the controller 7 in the phase control mode can delay the turning on of the low-side switching element Q2 by the preset time T5A relative to the start of an on period of the diode D2.

During the high-side switching element Q1 being on, the U-phase current Uc mainly flows through the high-side switching element Q1 because it can flow through the high-side switching element Q1 easier than through the diode D1, resulting in that the U-phase voltage Uv is clamped to substantially the sum of the battery voltage VB and the source-drain voltage $V_{SD}$ of the high-side switching element Q1 being on (see "HIGH-SIDE SWITCHING ELEMENT ON" in FIG. 4).

During the low-side switching element Q2 being on, until the conductive period of the corresponding diode D2 is on (see "LOW-SIDE SWITCHING ELEMENT ON" in FIG. 4), the U-phase current Uc mainly flows through the low-side switching element Q2 because it can flow through the low-side switching element Q2 easier than through the diode D2, resulting in that the U-phase voltage Uv is clamped to substantially the sum of 0 volts (ground level) and the source-drain voltage $V_{SD}$ of the low-side switching element Q2 being on (see "P1" in FIG. 4). After the conductive period of the corresponding diode D2 during the low-side switching element Q2 being on, because the U-phase current Uc is reversed in direction, the U-phase voltage Uv is clamped to substantially the source-drain voltage $V_{SD}$ of the low-side switching element Q2 being on (see "P2" in FIG. 4).

Because on and off timings of each pair of the high- and low-side switching elements Q3 and Q4 and of the high- and low-side switching elements Q5 and Q6 can be determined in the same procedures of determination of the on and off timings of the high- and low-side switching elements Q1 and Q2 set forth above, they can be eliminated in description.

Similarly, because on and off timings of each pair of the high- and low-side switching elements Q7 and Q8, the high- and low-side switching elements Q9 and Q10, and the high- and low-side switching elements Q11 and Q12 can be determined in the same procedures of determination of the on and off timings of the high- and low-side switching elements Q1 and Q2 set forth above, they can be eliminated in description.

As described above, the power generator 1 according to this embodiment is equipped with the zero-cross detector 9 that is operative to detect, for each of the first and second switching units 5 and 6, a zero-cross point each time each phase current is reversed in direction, thus directly and accurately detecting the phase (the direction) of each phase current at each of the zero-cross points. Thus, the power generator 1 is configured to predict, in the phase control mode, the phase and/or the length of one cycle of each phase voltage based on the phase (the direction) of a corresponding one phase current at each of the zero-cross points.

That is, as illustrated in FIG. 4, adjustment of the delay time (T5) for the U-phase voltage Uv to be predicted controls the phase and the length of cycle of the U-phase voltage Uv to be predicted. Specifically, because cycle of the U-phase voltage Uv is 360 electrical degrees ($2\pi$ radians), adjustment of the length of time corresponding to cycle of the U-phase voltage Uv and adjustment of the length of the delay time (T5) or a corresponding electrical angle relative to cycle of the U-phase voltage Uv controls the phase and the length of cycle of the U-phase voltage Uv.

For example, in order to maintain, at a high level, the power generation efficiency of the power generator 1, the power generator 1 can be configured to predict, in the phase control mode, the phase and/or the length of cycle of each phase voltage such that a corresponding preset delay time (T5), that is, a preset electrical angle, after the start of the on period of a corresponding diode is as small as possible. In contrast, in order to increase the amount of the output current of the power generator 1 in priority as compared with its power generation efficiency, the power generator 1 can be configured to predict, in the phase control mode, the phase and/or the length of cycle of each phase voltage such that a corresponding preset delay time (T5), that is, a preset electrical angle, after the start of the on period of a corresponding diode is as large as possible.

Thus, the power generator 1 according to this embodiment can accurately control the phase of each phase current based on a corresponding phase voltage with the predicted phase and cycle.

In addition, the power generator 1 according to this embodiment is configured to determine, in the phase control mode, an off timing of a switching element being on relative to a zero-cross point at which a corresponding phase current is reduced to be reversed in direction. This configuration can accurately turn off the switching element after the reverse of the corresponding phase current in direction, that is after the start of current being drawn from the battery 11 to a corresponding phase armature winding, making it possible to carry out control of increase in the output current of the power generator 1.

The power generator 1 according to this embodiment is configured to determine an off timing of a high- or low-side switching element relative to a previous zero-cross point, such as the zero-cross point B or C in FIG. 3, making it possible to carry out rectification of a three-phase AC voltage induced in each of the first and second armature windings 2 and 3 relative to at least one of previously detected zero-cross points.

In the phase control mode, the power generator 1 according to this embodiment is configured to turn off any one of high- and low-side switching elements for each phase armature winding, and after the lapse of a preset time, turn on the other of the high- and low-side switching elements. In addition, in the synchronous control mode, the power generator 1 according to this embodiment is configured to turn on, relative to a zero-cross point (for example, C in FIG. 3) of a current flowing through any one of high- and low-side switching elements for each phase armature winding, the other of high- and low-side switching elements. Each of these configurations can reliably prevent a pair of high- and low-side switching elements for each phase armature winding from being simultaneously turned on, making it possible to prevent generation of serge voltages and short-circuit between positive and negative terminals of the battery 11, thus preventing large loss due to them.

This embodiment is one aspect of the present invention, and modifications of this embodiment can be made within the scope of various aspects of the present invention.

For example, FIG. 1 illustrates that, as an example of the system configuration of the power generator 1, one set of the controller 7, the driver 8, and the zero-cross detector 9 is provided for the first and second switching units 5 and 6, but another aspect of the present invention is not limited thereto. Specifically, one set of the controller 7, the driver 8, and the zero-cross detector 9 can be provided for each of the first and second switching units 5 and 6, or one set of the controller 7, the driver 8, and the zero-cross detector 9 can be provided for each phase armature winding.

Figure 5:
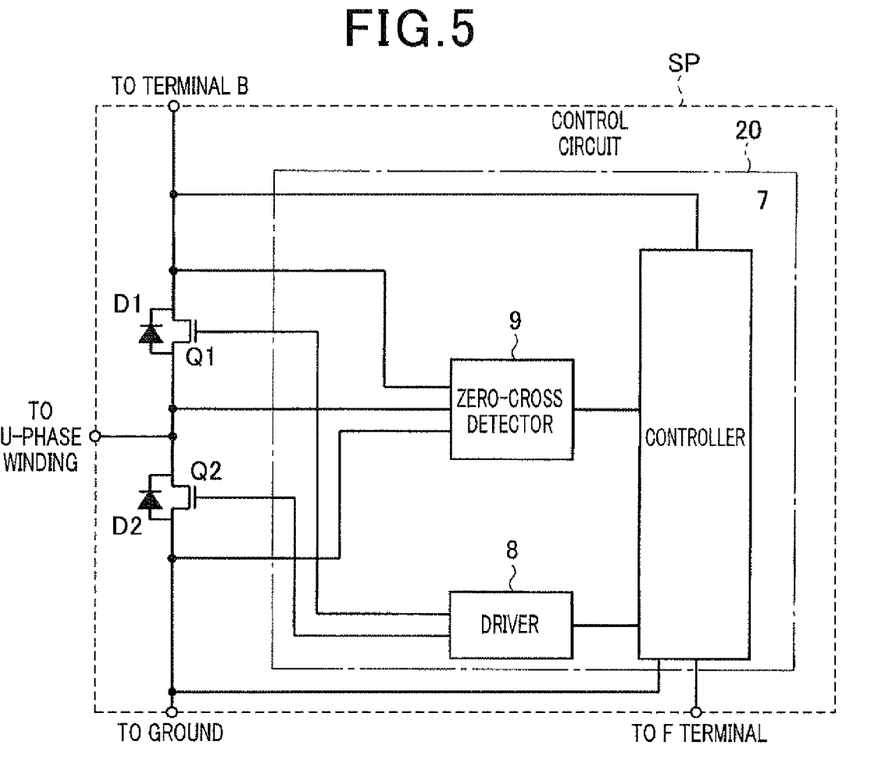
FIG. 5 is a partial structural view of the power generator in which one set of a controller, a driver, and a zero-cross detector is provided for each phase armature winding.

FIG. 5 is a partial structural view of the power generator 1 in which one set of the controller 7, the driver 8, and the zero-cross detector 9 is provided for each phase armature winding. Specifically, in the power generator 1, a control circuit 20 consisting of the controller 7, the driver 8, and the zero-cross detector 9 is provided for a pair of the high-side switching element Q1 with the diode D1 and the low-side switching element Q2 with the diode D2. Similarly, the same control circuits 20 are provided for the remaining respective pairs of high- and low-side switching elements each with a diode.

This modification allows the set of the control circuit 20 and one pair of high- and low-side switching elements each with a diode to be modularized, and the modularized component can be encapsulated as one semiconductor package SP as illustrated in FIG. 5. This structure of the power generator 1 with the semiconductor package SP for each phase armature winding facilitates manufacture and/or assembling of the first and second switching units 5 and 6. Particularly, the power generator 1 according to this embodiment set forth above is configured to determine on and off timings of a pair of high- and low-side switching elements for each phase armature winding relative to zero-cross points therefor without using a phase voltage across another phase armature winding. Thus, the modularized one pair of high- and low-side switching elements each with a diode for each phase armature winding can be turned on and off inside the corresponding package SP without requiring any wiring to another phase armature winding, resulting in simplified wiring in the power generator 1.

In this embodiment, one aspect of the present invention is applied to the power generator 1 equipped with the first and second armature windings 2 and 3, and with the first and second switching units 5 and 6, but another aspect of the present invention can be applied to a power generator equipped with one set of armature windings and one switching unit.

The power generator 1 according to this embodiment uses zero-cross points of a U-phase current flowing through the U-phase winding of the first switching unit 5 in determining on and off timings of the high- and low-side switching elements Q1 and Q2 for the U-phase winding, and uses these zero-cross points in detecting the rotational speed of the rotor 4M and/or in grasping the fluctuations in the rotational speed of the rotor 4M, but the power generator 1 can be applied to another aspect of the present invention.

Specifically, the power generator 1 according to another aspect of the present invention can be designed to:

uses zero-cross points of a U-phase current flowing through the U-phase winding of the first switching unit 5 in determining on and off timings of the high- and low-side switching elements Q1 and Q2 for the U-phase winding; and use zero-cross points corresponding another phase winding, such as V-phase winding, W-phase winding, X-phase winding, Y-phase winding, and Z-phase winding in detecting the rotational speed of the rotor 4M and/or in grasping the fluctuations in the rotational speed of the rotor 4M.

In addition, the power generator 1 according to another aspect of the present invention can be designed to:

uses zero-cross points of a U-phase current flowing through the U-phase winding of the first switching unit 5 in determining on and off timings of the high- and low-side switching elements Q1 and Q2 for the U-phase winding; and use these zero-cross points of the U-phase winding and zero-cross points corresponding to another phase winding, such as V-phase winding, W-phase winding, X-phase winding, Y-phase winding, and Z-phase winding in detecting the rotational speed of the rotor 4M and/or in grasping the fluctuations in the rotational speed of the rotor 4M.

Particularly, for determining, at a point of time after the lapse of a preset time, on or off timing of a high- or low-side switching element for a corresponding phase armature winding, the power generator 1 needs to determine the preset time to a value set for consideration of the rotational speed of the rotor 4M and/or the fluctuations in the rotational speed of the rotor 4M. In this case, the power generator 1 can detect the rotational speed of the rotor 4M and/or grasp the fluctuations in the rotational speed of the rotor 4M based on information including: zero-cross points of the corresponding phase armature winding, and zero-cross points of another phase armature winding.

Thus, the power generator 1 according to another aspect of the present invention can improve the accuracy of detecting the rotational speed of the rotor 4M and/or the accuracy of grasping the fluctuations in the rotational speed of the rotor 4M, resulting in increasing the accuracy of determining on and off timings of one pair of high- and low-side switching elements for each phase armature winding.

The power generator 1 according to this embodiment cannot detect zero-cross points if a peak value of a voltage induced in each phase armature winding is lower than the battery voltage because no currents flow through each switching element and each diode. A further aspect of the present invention aims to address such a case by starting the phase control task.

Specifically, in order to address such a case, the controller 7 according to the further aspect of the present invention is configured to monitor each phase voltage induced in a corresponding phase armature winding using, for example, the zero-cross detector 9. For example, as illustrated in FIG. 5, the zero-cross detector 9 can detect a U-phase voltage across the switching element Q2, and similarly, detect V- and W-phase voltages across the respective switching elements Q4 and Q6.

Then, the controller 7 according to the further aspect of the present invention is configured to drive on all of the low-side switching elements Q2, Q4, Q6, Q8, Q10, and Q12 if the monitored each phase voltage is lower than the battery voltage VB. For example, in the first three-phase armature windings 2, this drive allows a phase current induced in each of the U-, V-, and W-phase windings to flow through a corresponding one of the low-side switching elements Q2, Q4, and Q6. Thus, even if the phase voltage induced in each phase armature winding is lower than the battery voltage VB, the zero-cross detector 9 can detect a zero-cross point when a phase current flowing through each switching element or a corresponding diode is reversed in direction. This can be implemented in the second three-phase armature windings 3.

Using the detected zero-cross points, the controller 7 according to the further aspect is configured to start rectification of the three-phase voltages induced in the respective three-phase armature windings, thus increasing the output current of the power generator 1 according to the further aspect. This allows the increased output current to be drawn from the power generator 1 to the electrical loads even if the phase voltage induced in each phase armature winding is lower than the battery voltage VB.

Note that the controller 7 according to the further aspect can drive (turn on), in place of driving all of the low-side switching elements for the first three-phase armature windings, two low-side switching elements for the first three-phase armature windings 2, drive all of the low-side switching elements for the second three-phase armature windings 3, or drive all of the high-side switching elements for the first three-phase armature windings.

Figure 6:
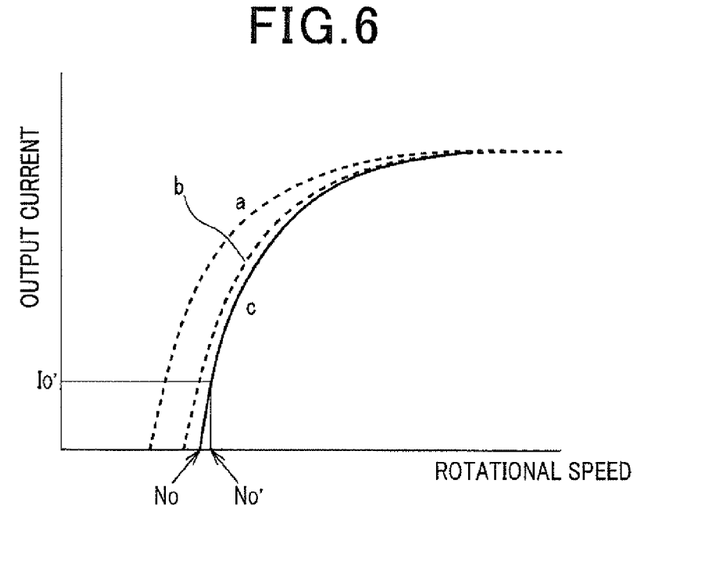
FIG. 6 is a graph schematically illustrating, in addition to a first reference output characteristic curve "a" and a second reference output characteristic curve "b" illustrated in FIG. 2, a third reference output characteristic curve "c" included in information stored in the controller illustrated in FIG. 1.

FIG. 6 schematically illustrates, in addition to the first reference output characteristic curve "a" and the second reference output characteristic curve "b", a third reference output characteristic curve "c" included in the information I; this third reference output characteristic curve "c" represents a relationship between a variable of the output current and a variable of the rotational speed of the rotor 4M; this third reference curve "c" has been obtained in a case where the power generator 1 has carried out rectification of a three-phase AC voltage using only the diodes D1 to D12.

In this graph of FIG. 6, the horizontal axis represents a variable of the rotational speed of the rotor 4M, and the vertical axis represents a variable of the output current of the power generator 1. In FIG. 6, reference character $N_0$ represents a transient build-up value of the rotational speed of the rotor 4M, and reference character $N_0'$ represents a value of the rotational speed of the rotor 4M corresponding to a value $I_0'$, such as 10 Amperes, of the output current.

Figure 7:
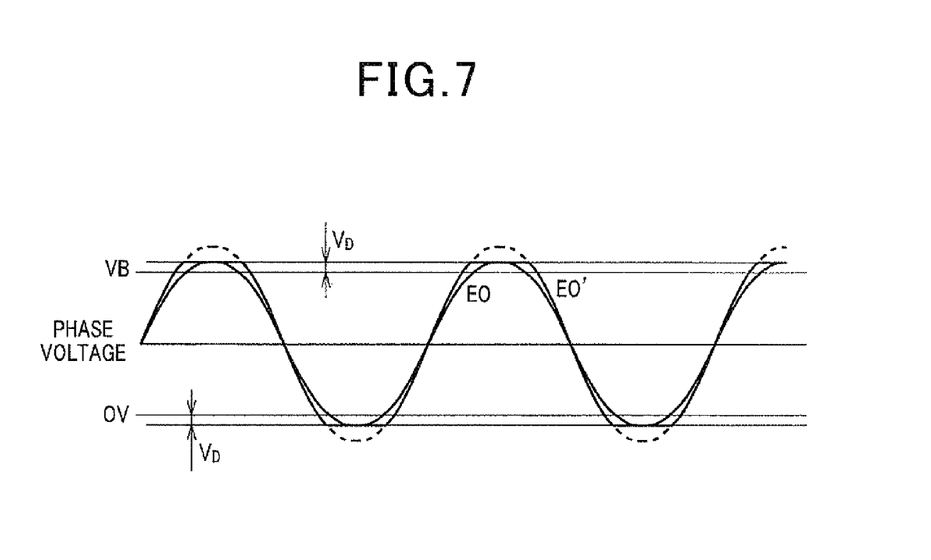
FIG. 7 is a graph schematically illustrating an example of the waveform of one phase voltage E0 induced in a corresponding one phase winding when a rotational speed of the rotor is $N_0$, and illustrating an example of the waveform of one phase voltage E0' induced in a corresponding one phase winding when the rotational speed of the rotor is $N_0'$.

FIG. 7 schematically illustrates an example of the waveform of one phase voltage E0 induced in a corresponding one phase winding when the rotational speed of the rotor 4M is $N_0$, and illustrates an example of the waveform of one phase voltage E0' induced in a corresponding one phase winding when the rotational speed of the rotor 4M is $N_0'$. As illustrated in FIG. 7, a peak value of the one phase voltage E0 corresponding to the transient build-up value of the rotational speed of the rotor 4M becomes the sum of the battery voltage VB and the forward voltage $V_D$ of a corresponding diode. If the one phase voltage is equal to or lower than the sum of the battery voltage VB and the forward voltage $V_D$ of a corresponding diode, no output currents are monitored so that no zero-cross points are detected.

Thus, the controller 7 according to the further aspect can simultaneously turn on at least two high- or low-side switching elements to thereby detect zero-cross points.

Figure 8:
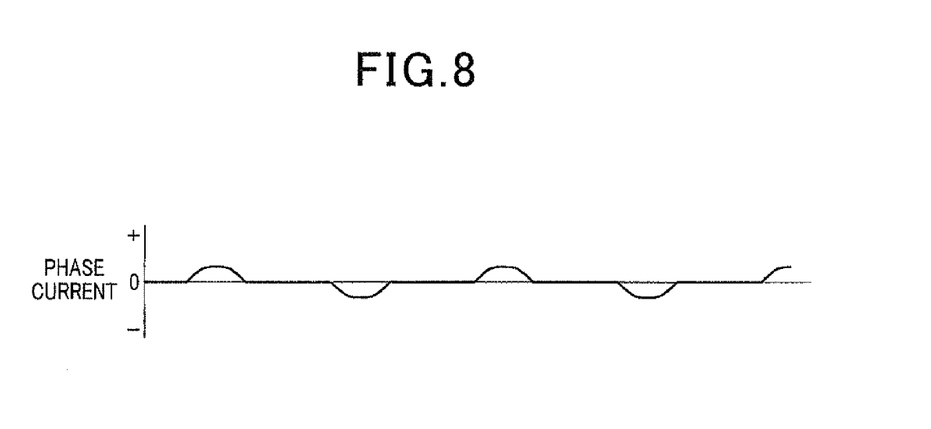
FIG. 8 is a graph view schematically illustrating one phase current if the rotational speed of the rotor is equal to or higher than the value N0' and lower than the value N0.

On the other hand, if the rotational speed of the rotor 4M is equal to or higher than the value N0 and lower than the value N0', because the output current is small (lower than 10 amperes), it is difficult to detect zero-cross points based on the one phase current. FIG. 8 is a graph schematically illustrating one phase current if the rotational speed of the rotor 4M is equal to or higher than the value N0' and lower than the value N0'.

As illustrated in FIG. 7 by E0', a peak value of one phase voltage with the rotational speed of the rotor 4M being lower than the value N0' is temporarily higher than the sum of the battery voltage VB and the forward voltage $V_D$ of a corresponding diode within a period, so that a small phase current flows within the period. Thus, in this case, the controller 7 according to the further aspect can simultaneously turn on at least two high- or low-side switching elements to thereby detect zero-cross points if one phase voltage is equal to or lower than a dashed peak value of the phase voltage E0', corresponding to the value N0' of the rotational speed of the rotor 4M without simultaneously turning on at least two high- or low-side switching elements if the one phase voltage is equal to or lower than the sum of the battery voltage VB and the forward voltage $V_D$ of a corresponding diode.

However, because a current actually flows through a corresponding diode when the phase voltage E0' exceeds the sum of the battery voltage VB and the forward voltage $V_D$ of the corresponding diode so that the phase voltage E0' is clamped to the sum of the battery voltage VB and the forward voltage $V_D$, the dashed peak value of the phase voltage E0' cannot be detected. Thus, the controller 7 according to the further aspect can simultaneously turn on at least two high- or low-side switching elements to thereby detect zero-cross points during low rotational speed of the rotor 4M to start the phase control task, and continuously carry out the phase control task until the rotational speed of the rotor 4M reaches the value N0' or N0.

Second Embodiment

A power generator according to the second embodiment of the present invention will be described hereinafter with reference to mainly FIG. 9.

The structure and/or functions of the power generator according to the second embodiment are different from the power generator 1 by the following point. So, the different point will be mainly described hereinafter.

The controller 7 according to the second embodiment is designed to switch the synchronous control mode and the phase control mode based on the rotational speed of the rotor 4M and a duty cycle DC at the F terminal corresponding to the duty cycle of the switching element SE. The duty cycle DC at the F terminal represents the percent of a high-side potential at the F terminal to each on and off cycle of the switching element SE.

For example, the controller 7 is connected with the F terminal, and is adapted to detect the duty cycle DC at the F terminal (duty cycle of the switching element SE) by itself without any aid of another device, and the controller 7 can grasp the present duty cycle DC of the F terminal corresponding to the duty cycle of the switching element SE.

Figure 9:
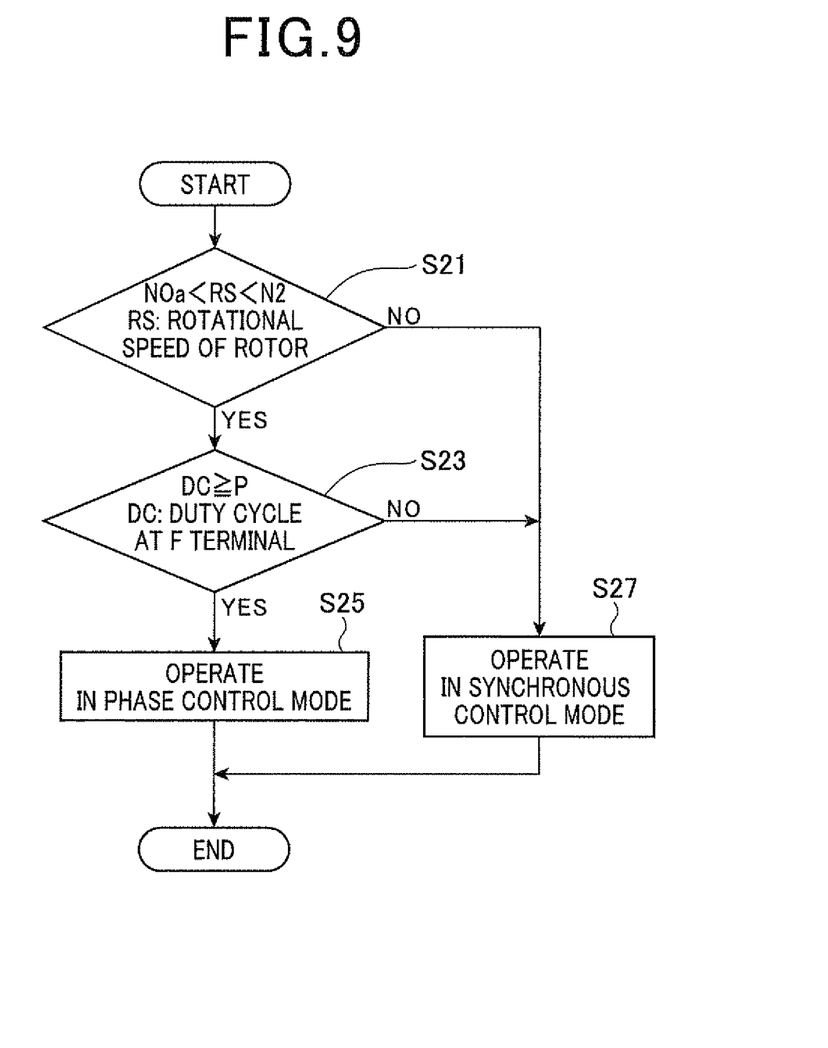
FIG. 9 is a flowchart schematically illustrating an operation mode switching routine to be executed by a controller according to the second embodiment of the present invention.

Specifically, the controller 7 is designed to determine whether a value of the rotational speed RS of the rotor 4M is higher than a preset value N0$a$ (see FIG. 2, such as 1000 RPM) and lower than the preset value N2 (see FIG. 2, such as 2500 RPM), and whether a value of the duty cycle DC at the F terminal is equal to or greater than a predetermined high percent P, such as 90 percent in respective steps S21 and S23 in FIG. 9.

If a value of the rotational speed RS of the rotor 4M is higher than the preset value N0$a$ and lower than the preset value N2, and a value of the duty cycle DC at the F terminal is equal to or greater than the predetermined high percent P (see "YES" in steps S21 and S23 in FIG. 9), the controller 7 according to this embodiment is designed to carry out the phase control task in step S25.

Otherwise, if either a value of the rotational speed RS of the rotor 4M is equal to or lower than the preset value N0$a$, equal to or higher than the preset value N2, or the value of the duty cycle DC at the F terminal is lower than the predetermined high percent P (see "NO" in step S21 or S23 in FIG. 9), the controller 7 according to this embodiment is designed to carry out the synchronous control task in step S27.

That is, the controller 7 of this embodiment can grasp, based on the present value of the rotational speed of the rotor 4M, a first phase-control requirement state in which the rotational speed of the rotor 4M is within, for example, a given low RPM range from 1000 RPM to 2500 RPM in which executing the phase control task can increase the output current.

In addition, the controller 7 of this embodiment can grasp, based on the duty cycle DC at the F terminal (duty cycle of the switching element SE), a second phase-control requirement state in which the total value of the power requirements of the electrical roads is relatively high, for example, the battery voltage is relatively low and/or the number of activated electrical loads in all of the electrical loads is relatively high.

Thus, if both of the first and second phase-control requirement states are grasped, the controller 7 switches its operation mode from the synchronous control mode to the phase control mode. This can increase the output power that meets the increase in the total value of the power requirements of the electrical roads, effectively controlling the output power of the power generator 1.

In other words, unless both of the first and second phase-control requirement states are grasped, the controller 7 continues to operate in the synchronous control mode to thereby continuously execute the synchronous control task. This can prevent the controller 7 from operating in the phase control mode to execute the phase control task except when both of the first and second phase-control requirement states are grasped, thus maintaining at high level the power generation efficiency of the power generator 1.

In addition, because the controller 7 can detect the duty cycle at the F terminal without requiring any device, such as external ECUs, it is possible to simply grasp whether the total value of the power requirements of the electrical loads is high.

The power generator 1 according to each of the first and second embodiment is configured to effectively switch the operation mode of the controller 1 between the synchronous control mode and the phase control mode without using rotational speed sensors for measuring the rotational speed of the rotor 4M and current sensors for measuring current flowing through each phase armature winding. Thus, it is possible to implement the effective switching of the operation mode of the controller 7 between the synchronous control mode and the phase control mode without increasing the cost and/or size of the power generator 1. Of course, the power generator 1 can switch the operation mode of the controller 1 between the synchronous control mode and the phase control mode using such a rotational speed sensor and/or a current sensor.

In each of the first and second embodiments, a still further aspect of the present invention can be applied to a power generator equipped with at least three sets of multiphase armature windings and corresponding at least three sets of switching units.

While an illustrative embodiment of the invention has been described herein, the present invention is not limited to the embodiment described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. A power generator comprising:
at least two-phase armature windings;
a switching unit including, for each of the at least two-phase armature windings, a pair of a high-side switching element with a first diode parallely connected thereto and a second low-side switching element with a second diode parallely connected thereto, the switching unit being configured to rectify, through at least one of the high-side switching element, the first diode, the second low-side switching element, and the second diode, a voltage induced in each of the at least two-phase armature windings;
a zero-cross detector that detects a point of time when a phase current based on the voltage induced in each of the at least two-phase armature windings is reversed in direction as a zero-cross point of the phase current; and
a determiner that determines an off timing of at least one of the high-side switching element and the low-side switching element for each of the at least two-phase armature windings relative to the zero-cross point detected by the zero-cross detector.

2. The power generator according to claim 1, wherein the determiner is configured to determine the off timing of the at least one of the high-side switching element and the low-side switching element for each of the at least two-phase armature windings relative to the zero-cross point of the phase current flowing through a corresponding one of the at least two-phase armature windings.

3. The power generator according to claim 2, wherein the zero-cross detector and the determiner are provided for each of the at least two-phase armature windings.

4. The power generator according to claim 2, wherein the zero-cross detector is configured to detect, in a plurality, the zero-cross point each time the phase current based on the voltage induced in each of the at least two-phase armature windings is reversed in direction, and the determiner is configured to determine the off timing of the at least one of the high-side switching element and the low-side switching element relative to one of the plurality of zero-cross points, the phase current being reduced so as to be reversed in direction at the one of the plurality of zero-cross points.

5. The power generator according to claim 1, further comprising a field rotor configured to rotate to generate a rotating magnetic field, the rotating magnetic field inducing the voltage in each of the at least two-phase armature windings, wherein the zero-cross detector is configured to detect, in a plurality, the zero-cross point each time the phase current based on the voltage induced in each of the at least two-phase armature windings is reversed in direction, and the determiner is configured to, when at least one of first and second conditions is met at a present time, determine the off timing of the at least one of the high-side switching element and the low-side switching element relative to at least one of the plurality of zero-cross points, the first condition being that an output current from the switching unit is equal to or lower than a preset value, the second condition being that a rotational speed of the rotor is equal to or hither than a preset value, the at least one of the plurality of zero-cross points being previously detected since the present time.

6. The power generator according to claim 1, wherein the determiner is configured to, for each of the at least two-phase armature windings, turn off one of the high-side switching element and the low-side switching element, and, after a lapse of a preset time since the off of the one of the high-side switching element and low-side switching element, turn on the other of the high-side switching element and low-side switching element.

7. The power generator according to claim 1, further comprising a field rotor configured to rotate to generate a rotating magnetic field, the rotating magnetic field inducing the voltage in each of the at least two-phase armature windings, wherein the determiner is configured to, when at least one of first and second conditions is met at a present time, determine the off timing of any one of the high-side switching element and the low-side switching element relative to the zero-cross point of the phase current flowing through the other of the high-side switching element and the low-side switching element, the first condition being that an output current from the switching unit is equal to or lower than a preset value, the second condition being that a rotational speed of the rotor is equal to or hither than a preset value.

8. The power generator according to claim 1, wherein the determiner is configured to:
   determine each of the off timing and an on timing of each of the high-side switching element and the low-side switching element for each of the at least two-phase armature windings to a timing after a lapse of a preset time since the zero-cross point of the phase current flowing through a corresponding one of the at least two-phase armature windings, the preset time being determined based on the zero-cross point of the phase current flowing through the other of the at least two-phase armature windings.

9. The power generator according to claim 1, wherein the determiner is configured to simultaneously turn on any one of:
   the high-side switching element for one of the at least two-phase armature windings, and the high-side switching element for the other of the at least two-phase armature windings; and
   the low-side switching element for one of the at least two-phase armature windings, and the low-side switching element for the other of the at least two-phase armature windings.

10. A power generator comprising:
   at least two-phase armature windings;
   a switching unit including, for each of the at least two-phase armature windings, a pair of a high-side switching element with a first diode parallely connected thereto and a second low-side switching element with a second diode parallely connected thereto, the switching unit being configured to rectify, through at least one of the high-side switching element, the first diode, the second low-side switching element, and the second diode, a voltage induced in each of the at least two-phase armature windings;
   a phase detector that directly detects a phase of a phase current, the phase current being generated based on the voltage induced in each of the at least two-phase armature windings; and
   a controller configured to operate, in a phase control mode, to turn on each of the high-side switching element and the low-side switching element within an on period, the on period being delayed since a start of a conductive period of a corresponding one of the first and second diodes, the on period of each of the high-side switching element and the low-side switching element being determined based on the detected phase of the phase current.

11. A power generator according to claim 10, wherein the phase detector includes a zero-cross detector that detects, as a zero-cross point of the phase current, a point of time when the phase current generated based on the voltage induced in each of the at least two-phase armature windings is reversed in direction, the zero-cross point of the phase current being information indicative of the phase of the phase current.

12. The power generator according to claim 11, wherein the controller is configured to operate, in a synchronous control mode, to turn on and off each of the high-side switching element and the low-side switching element such that the on period of each of the high-side switching element and the low-side switching element is within the conductive period of a corresponding one of the first and second diodes, the controller being configured to selectively operate in one of the phase control mode and the synchronous control mode, an on timing and an off timing of each of the high-side switching element and the low-side switching element being determined relative to the zero-cross point detected by the zero-cross detector.

13. The power generator according to claim 12, further comprising a field rotor configured to rotate to generate a rotating magnetic field, the rotating magnetic field inducing the voltage in each of the at least two-phase armature windings, wherein the controller being configured to selectively operate in the phase control mode when power requirement for the power generator is higher than a preset value and a rotational speed of the rotor is lower than a preset value.

14. A power generator comprising:
   a rotor including a field winding;
   at least two-phase armature windings, when the field winding is energized with the rotor being rotated to generate a rotating magnetic field, each of the at least two-phase armature winding being configured to induce a voltage therein based on the generated rotating magnetic field;
   a switching unit including, for each of the at least two-phase armature windings, a pair of a high-side switching element with a first diode parallely connected thereto and a second low-side switching element with a second diode parallely connected thereto, the switching unit being configured to rectify, through at least one of the high-side switching element, the first diode, the second low-side switching element, and the second diode, a voltage induced in each of the at least two-phase armature windings;
   a voltage regulator having a switching element connected with the field winding, the voltage regulator being configured to control a duty cycle of the switching element to thereby regulate an output of the switching unit; and
   a controller configured to:
   operate, if a rotational speed of the rotor is higher than a first preset value and lower than a second preset value higher than the first preset value, and a value of the duty cycle of the switching element is equal to or higher than a preset value, in a phase control mode to turn on each of the high-side switching element and the low-side switching element within an on period, the on period being delayed since a start of a conductive period of a corresponding one of the first and second diodes; and
   operate, if at least one of the rotational speed of the rotor is equal to or lower than the first preset value, the rotational speed of the rotor is equal to or higher than the second preset value, and the value of the duty cycle of the switching element is lower than the preset value, in a synchronous control mode to turn on and off each of the high-side switching element and the low-side switching element such that the on period of each of the high-side switching element and the low-side switching element is within the conductive period of a corresponding one of the first and second diodes.

* * * * *